June 30, 1931. P. RUDOLPH 1,812,717
LENS SYSTEM
Filed Oct. 14, 1926
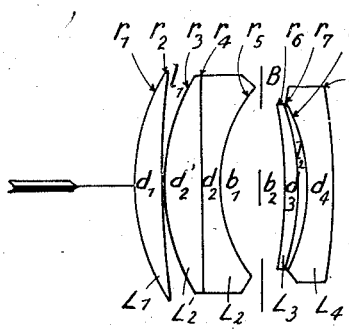

Patented June 30, 1931

1,812,717

UNITED STATES PATENT OFFICE

PAUL RUDOLPH, OF GROSSBIESNITZ, NEAR GORLITZ, GERMANY

LENS SYSTEM

Application filed October 14, 1926, Serial No. 141,474, and in Germany August 18, 1926.

For optical purposes as also for photographic purposes it is still the object of manufacturers to produce and the desire of users to possess a lens system which projects an image of the greatest illumination, of the greatest sharpness whilst having an image area of large angle and free from distortion. All these conditions are demanded to the fullest extent from photographic objectives. They are however equally necessary for projection objectives, and for microscope and telescope objectives.

The problem is solved when it is possible to render the lens system free from spherical aberrations of the second order within the correction of the first order for all colours and for a great aperture to fulfil the sine condition, to neutralize the coma, to eliminate astigmatism over a large plane image field, to avoid distortion and to render an image free from troubling reflections.

Solving this problem is difficult and many lens combinations have already been introduced into the industry with this aim in view. However, it has not yet been possible to reach the end, as in one or more respects the extreme requirements are not fulfilled.

By means of the new system hereinafter described a further important advance is made. With relative small curvatures of lenses there are obtained a large aperture, a large image field and an almost complete elimination of the second aberrations of all corrections. Small lens curvatures in proportion to the diameter guarantee security in the quality of the image and facilitate manufacture of the lenses on a commercial scale. It has also been possible to produce the anastigmatic plane of the image field, in many cases even without the use of heavy barium crown glass and to use glass of which the primary features are purity and durability and which are colourless.

This improvement has been rendered possible by providing a five lens-system which possesses in its interior a convexo-concave dispersive lens and a collective lens with an equivalent focus smaller than three times the equivalent focus of the five lens system, which two lenses bound a biconvex airspace dividing the five lens-system into two collective members of which the one member consists of a collective lens and separated by airspace of a dispersive lens form having a very small thickness in the axis, and of a very thick dispersive lens consisting of a collective lens cemented with a dispersive lens, and of which the other member consists of two collective lenses enclosing, by means of an airspace, a dipersive lens.

For a large image area it is important that the curvatures determining the power of the lens turn their concavity towards the middle of the objective.

All the separate lenses may be simple lenses. In order, however, not to be restricted in the selection of durable glass-materials of a perfect condition, one or more lenses are formed of two cemented portions of different dispersing power, namely, cemented collective and dispersive lenses.

In the figure on the drawing accompanying the present application, the lens is shown as consisting of five separate lenses.

The following example of the new rapid lens is illustrated on the drawing. Only the lenses L2' and L2 are cemented while the other lenses L1, L3, L4 and L5 are single lenses. The reference letters correspond with those in the illustration. B is the position of the diaphragm.

Example

Objective consisting of five separated lenses. Relative opening 1:3.2. Focal length 100.

| Radii | Thickness and intervals |
|---|---|
| $r_1 = + 32.46$ | $d_1 = 3.86$ |
| $r_2 = +185.5$ | $l_1 = 0$ |
| $r_3 = + 29.37$ | $d_2 = 4.17$ |
| $r_4 = \infty$ | $d_2' = 2.01$ |
| $r_5 = + 18.55$ | $b_1 = 5.41$ |
| $r_6 = - 77.30$ | $b_2 = 2.32$ |
| $r_7 = - 37.10$ | $d_3 = 1.70$ |
| $r_8 = - 25.66$ | $l_2 = 1.08$ |
| $r_9 = -208.7$ | $d_4 = 3.09$ |
| $r_{10} = -219.5$ | $l_3 = 8.97$ |
| $r_{11} = - 32.31$ | $d_5 = 4.17$ |

*Types of glass*

$L_1 = L_3 : n_D = 1{,}5331 \quad \nu = 58.0$
$L_2' = L_5 : n_D = 1{,}5795 \quad \nu = 53.8$
$L_2 = L_4 : n_D = 1{,}5749 \quad \nu = 41.3$

Having thus described my invention, what I claim as new and desire to secure by Letters Patent of the United States is:

A rapid five-lens system corrected for the spherical aberrations of the first and of the second order, containing in its interior a convexo-concave dispersive lens and a collective lens with an equivalent focus smaller than three times the equivalent focus of the entire five-lens system, which said two lenses bound a biconvex airspace that divides the entire five-lens system into two members both of which are collective; of which one member consists of (1) a collective lens, (2) an airspace of dispersive-lens form very thin along its axial line, and (3) a very thick dispersive lens itself consisting of a collective lens cemented to a dispersive lens; the other member consisting of two collective lenses with a dispersive lens interposed therebetween and separated from the said collective lenses by air-spaces.

In testimony whereof I affix my signature.

Dr. PAUL RUDOLPH.